United States Patent
Seok et al.

(10) Patent No.: US 10,694,407 B2
(45) Date of Patent: Jun. 23, 2020

(54) METHOD AND DEVICES FOR SECURE MEASUREMENT EXCHANGE

(71) Applicant: MEDIATEK INC., Hsin-Chu (TW)

(72) Inventors: Yongho Seok, San Jose, CA (US); Chao-Chun Wang, San Jose, CA (US); James Yee, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 12 days.

(21) Appl. No.: 16/030,718

(22) Filed: Jul. 9, 2018

(65) Prior Publication Data

US 2019/0014491 A1   Jan. 10, 2019

Related U.S. Application Data

(60) Provisional application No. 62/530,361, filed on Jul. 10, 2017, provisional application No. 62/550,027, filed on Aug. 25, 2017, provisional application No. 62/595,123, filed on Dec. 6, 2017, provisional application No. 62/646,945, filed on Mar. 23, 2018.

(51) Int. Cl.
| | |
|---|---|
| *H04W 24/08* | (2009.01) |
| *H04L 29/06* | (2006.01) |
| *H04W 4/02* | (2018.01) |
| *H04W 12/12* | (2009.01) |
| *H04W 4/00* | (2018.01) |
| *H04W 12/06* | (2009.01) |

(52) U.S. Cl.
CPC ............ *H04W 24/08* (2013.01); *H04L 63/12* (2013.01); *H04W 4/00* (2013.01); *H04W 4/025* (2013.01); *H04W 12/06* (2013.01); *H04W 12/12* (2013.01)

(58) Field of Classification Search
CPC ..... H04W 24/08; H04W 4/025; H04W 12/12; H04W 4/00; H04W 12/06; H04L 63/12
See application file for complete search history.

(56) References Cited

U.S. PATENT DOCUMENTS

| | | | |
|---|---|---|---|
| 2017/0064575 A1 | 3/2017 | Eyal et al. | |
| 2017/0149799 A1 | 5/2017 | Vamaraju et al. | |
| 2017/0261591 A1* | 9/2017 | Zhang | ............... G01S 5/14 |
| 2018/0027561 A1* | 1/2018 | Segev | ............ H04L 5/0055 370/329 |
| 2018/0287826 A1* | 10/2018 | Lindskog | ............ H04L 25/0226 |

FOREIGN PATENT DOCUMENTS

WO   WO-2015130712 A1 *  9/2015

OTHER PUBLICATIONS

Ganesh Venkatesan et al, 802.11az Negotiation, doc.: IEEE P802.11-17-0591r2, May 10, 2017, XP055527483.
Erik Lindskog et al, Ranging PHY Security, doc.: IEEE 802.11-17/0780r2, May 10, 2017, XP068116063.

* cited by examiner

*Primary Examiner* — Omar J Ghowrwal

(57) ABSTRACT

Embodiments of the present invention provide secure ranging measurements for wireless devices in multi-user (MU) mode. Specifically, a signaling procedure between an initiating wireless station (ISTA) and a responding wireless station (RSTA) is used to enable protection of randomized LTF sequences used in the secure ranging measurements. The signaling procedure may be performed in a HEz or VHTz mode and may include performing error recovery when operating in the HEz mode.

20 Claims, 9 Drawing Sheets

Computer System 1112

METHOD AND DEVICES FOR SECURE MEASUREMENT EXCHANGE

CROSS-REFERENCE TO RELATED APPLICATIONS

This application claims the benefit of and priority to provisional patent application Ser. No. 62/530,361, with filing date Jul. 10, 2017, and hereby incorporated by reference in its entirety.

This application claims the benefit of and priority to provisional patent application Ser. No. 62/550,027, with filing date Aug. 25, 2017, and hereby incorporated by reference in its entirety.

This application claims the benefit of and priority to provisional patent application Ser. No. 62/595,123, with filing date Dec. 6, 2017, and hereby incorporated by reference in its entirety.

This application claims the benefit of and priority to provisional patent application Ser. No. 62/646,945, with filing date Mar. 23, 2018, and hereby incorporated by reference in its entirety.

This application is related to copending patent application Ser. No. 16/030,710, entitled "SECURE RANGING MEASUREMENT," which is hereby incorporated by reference in its entirety.

FIELD

Embodiments of the present invention generally relate to the field of wireless communications. More specifically, embodiments of the present invention relate to systems and methods for measuring distances between devices using wireless and electronic communications.

BACKGROUND

There is a growing need, in the field of wireless communication, to accurately and securely determine distances (ranging) between wireless devices (e.g., wireless stations (STAs) and access points (APs)). Existing approaches to determining distances between wireless devices are vulnerable to physical-level security attacks from malicious actors, such as denial of services attacks, perturbation attacks, and spoofing attacks.

Spoofing attacks are potentially the most dangerous form of security threat when performing ranging between wireless devices. During a spoofing attack, the attacker interferes with the victim's ranging and is able to control ("spoof") the victim's perceived range. For example, some applications for wireless ranging require heightened security, such as when using wireless ranging for accessing electronic door locks, computer locks, and ATMs that provide access to funds of a bank account. In these cases, the spoofed ranging measurement should be identified as invalid and discarded to prevent property loss.

Other forms of security attacks concerning wireless ranging, such as denial of service attacks, are very difficult to protect from. In a denial of service attack, the attacker interferes with the ranging signal in such a way to prevent the AP from providing services as intended. Perturbation attacks interfere with the victims ranging, but the attacker is unable to control the resulting range as perceived by the victim.

Existing work has indicated that for security purposes, in high efficiency (HE) and very high throughput (VHT) modes, the fields over which range measurements are performed, such as long training fields (LTF), should be protected against a VHT/HE Type B adversary attack. Further, for the purposes of the physical (PHY) security mode, the field used to channel/time-of-arrival (TOA) measurement should not include any form of repetition in the time domain, or any structure that is predictable.

What is needed is a technique for signaling between wireless devices that enables LTF protection to prevent spoofing attacks in single user (SU) and multi-user (MU) modes.

SUMMARY

Embodiments of the present invention provide secure ranging measurements for wireless devices in SU and MU modes. Specifically, a signaling procedure between an initiating wireless station (ISTA) and a responding wireless station (RSTA) is used to enable protection of randomized LTF sequences used in the secure ranging measurements. The signaling procedure may be performed in a HEz or VHTz mode and may include performing error recovery when operating in the HEz mode.

According to one embodiment, a method of secure measurement exchange between wireless devices is disclosed. The method includes receiving an initial FTM request from an initiating STA, transmitting a FTM frame including LTF generation information and an associated LTF generation sequence authentication code to the initiating STA, transmitting an uplink sounding trigger frame including LTF generation information and an LTF generation sequence authentication code from a responding STA to the initiating STA, receiving a UL-NDP frame from the initiating STA, where the UL-NDP frame includes a first LTF sequence derived from the LTF generation information associated with the LTF generation sequence authentication code, transmitting an NDP announcement frame and a DL-NDP frame from the responding STA, where the DL-NDP frame includes a second LTF sequence derived from the LTF generation information associated with the LTF generation sequence authentication code, and transmitting an LMR frame generated according to the first and second LTF sequences.

According to another embodiment, a device for performing secure measurement exchange between wireless devices. The device includes a memory for storing data, and a processor communicatively coupled to the memory and configured to execute instructions for performing a method of secure measurement exchange. The method includes receiving an initial FTM request from an initiating STA, transmitting a FTM frame including LTF generation information and an associated LTF generation sequence authentication code to the initiating STA, transmitting an uplink sounding trigger frame including the LTF generation sequence authentication code to the initiating STA, receiving a UL-NDP frame from the initiating STA, where the UL-NDP frame includes a first LTF sequence derived from the LTF generation information associated with the LTF generation sequence authentication code, transmitting an NDP announcement frame and a DL-NDP frame to the initiating STA, where the DL-NDP frame includes a second LTF sequence derived from the LTF generation information associated with the LTF generation sequence authentication code, and transmitting an LMR frame generated according to the first and second LTF sequences.

According to a third embodiment, a device for performing secure measurement exchange between wireless devices is disclosed. The device includes a memory for storing data, and a processor communicatively coupled to the memory and configured to execute instructions for performing a method of secure measurement exchange. The method includes transmitting an initial FTM request to a responding STA, receiving an FTM frame including LTF generation information and an LTF generation sequence authentication code from the responding STA, receiving an uplink sounding trigger frame including the LTF generation sequence authentication code from the responding STA, transmitting a UL-NDP frame to the responding STA, where the UL-NDP frame includes a first LTF sequence derived from the LTF generation information associated with the LTF generation sequence authentication code, receiving an NDP announcement frame and a DL-NDP frame, where the DL-NDP frame includes a second LTF sequence derived from the LTF generation information associated with the LTF generation sequence authentication code, and receiving an LMR frame generated according to the first and second LTF sequences.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
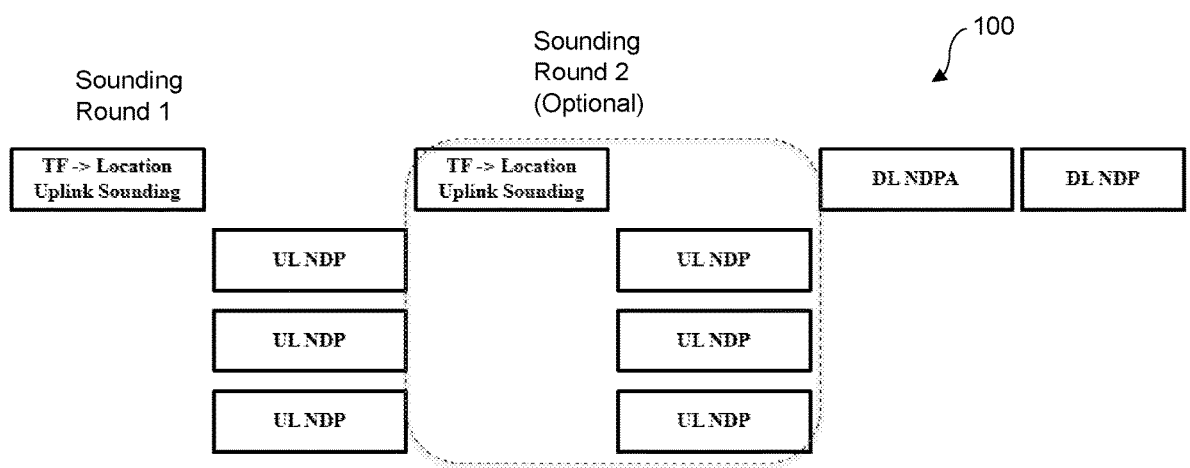
FIG. 1 depicts an exemplary MU ranging measurement procedure according to embodiments of the present invention, where the MU ranging measurement consists of one or more rounds of uplink sounding followed by one round of downlink sounding.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein (e.g., FIGS. 7 and 8) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying," "encoding," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Secure MU Ranging Measurement Procedure in Accordance with Embodiments of the Present Invention Embodiments of the present invention provide secure ranging measurements for wireless devices in MU mode. Specifically, a signaling procedure between an initiating wireless station (ISTA) and a responding wireless station (RSTA) is used to enable protection of randomized LTF sequences used in the secure ranging measurements. The signaling procedure may be performed in a High Efficiency (HEz) or Very High Throughput (VHTz) mode and may include performing error recovery when operating in the HEz mode.

FIG. 1 depicts an exemplary MU ranging measurement procedure 100 according to embodiments of the present invention. The exemplary MU ranging measurement consists of one or more rounds of uplink (UL) sounding followed by one round of downlink (DL) sounding. For example, Uplink Sounding Round 1 is performed using a plurality of UL-NDP frames, and Uplink Sounding Round 2 may also be performed using a second plurality of UL-NDP frames. Both the UL-NDP ranging frames and the DL-NDP ranging frames depicted in FIG. 1 may be configured with secure (e.g., randomized) LTF sequences. The Trigger Frame (TF)→Location Uplink Sounding indicates the SAC to use for the following NDP frame corresponding to the LTF generation information. After receiving the TF→Location Uplink Sounding, the ISTA uses the LTF generation information associated with the SAC.

Figure 2:
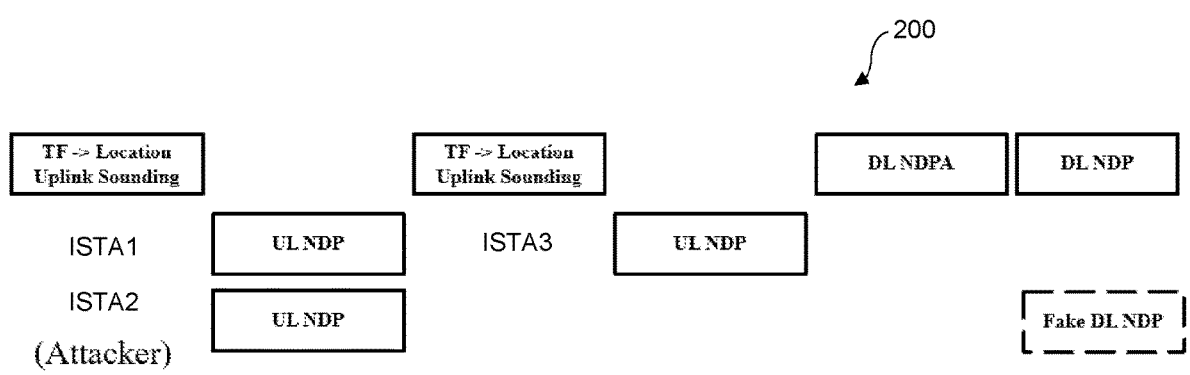
FIG. 2 illustrates a scenario where an attacker is a member of the MU ranging measurement according to embodiments of the present invention, where the attacker can transmit a fake or spoofed DL NDP when a LTF sequence in a DL NDP is known by all members of the MU ranging measurement.
Figure 3:
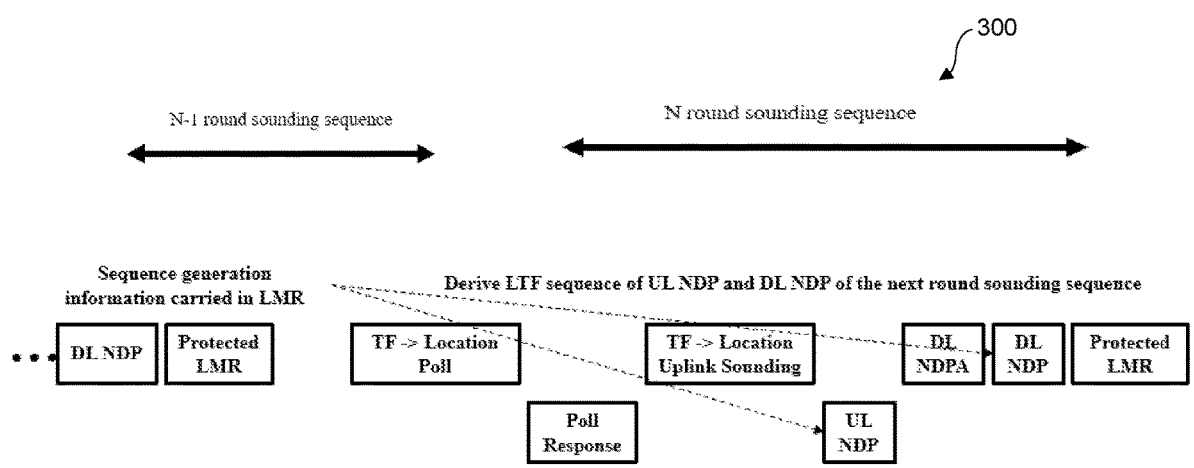
FIG. 3 depicts an exemplary secure MU ranging measurement procedure limited to a single ISTA described according to embodiments of the present invention.

As depicted in ranging measurement procedure 200 of FIG. 2, when an attacker is a member of the MU ranging measurement, the attacker can transmit a fake or spoofed DL-NDP if a LTF sequence in a DL-NDP is known by all members of the MU ranging measurement. Therefore, as depicted in ranging measurement procedure 300 of FIG. 3, one exemplary secure MU ranging measurement procedure described according to embodiments of the present invention is limited to a single ISTA. The sequence generation may be delayed when sequence generation information is carried in the previous sounding sequence instance (e.g., sounding round N−1).

Moreover, when an attacker is a member of the MU Ranging Measurement, and the DL-NDP is a SU PPDU format, even when both the UL-NDP and DL-NDP are designed with secure (e.g., randomized) LTF sequences, the attacker can know the LTF sequence of DL-NDP and use it to transmit a fake DL-NDP. Therefore, according to some embodiments of the present invention, a DL-NDP having an individual secure LTF sequence for each STA is transmitted in MU format. STA Info of DL-NDP can be carried in either a DL-NDPA or a DL-NDP PHY header. However, the number of the STSs that can be multiplexed in a single DL-NDP is limited. Therefore, when considering a staged mode, additional DL-NDPs should follow. For example, assuming that the STA Info of DL-NDP is carried in the DL-NDP's PHY header, the DL-NDPA should indicate the number of following DL-NDPs. Therefore, if the STA Info of DL-NDP is carried in DL NDPA, additional DL-NPDA and DL-NDP sequences should follow.

Figure 4:
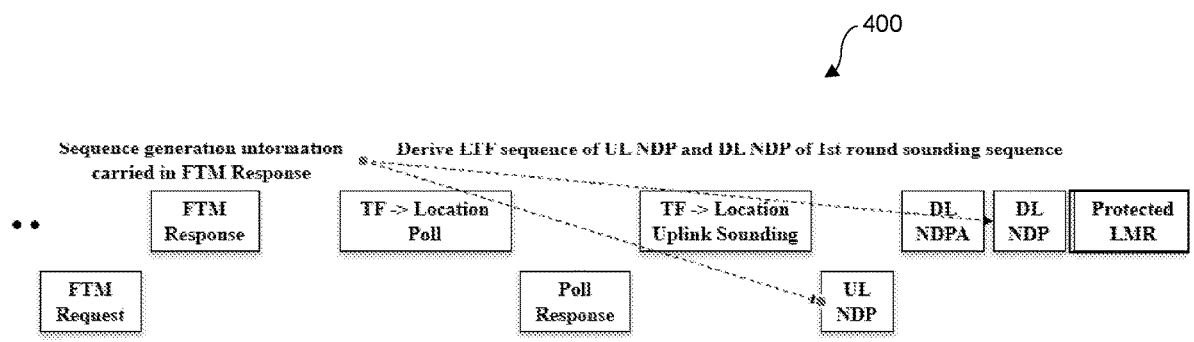
FIG. 4 depicts an exemplary secure MU ranging measurement procedure is according to embodiments of the present invention, where the LTF sequence generation information is stored in an initiating FTM frame.

With regard to FIG. 4, an exemplary secure MU ranging measurement procedure 400 is described according to embodiments of the present invention, where the LTF sequence generation information is stored in an initiating FTM (IFTM) frame. The keys or cipher sequence (if needed) for LTF sequence generation are the result of the FTM negotiation, and the frame used to deliver subsequent LTF sequence generation information is the protected LMR frame. LTF sequence generation information for the first measurement instance is included in the IFTM, and the measurement phase begins only when the negotiation has completed successfully.

Figure 5:
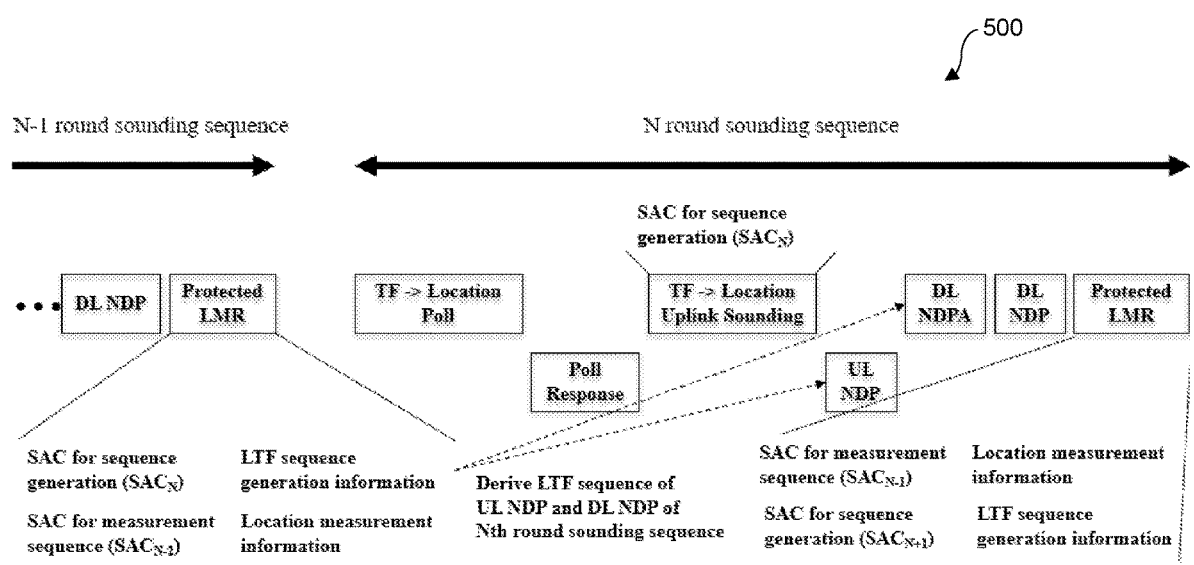
FIG. 5 depicts an exemplary secure MU ranging measurement procedure according to embodiments of the present invention, where the LTF sequence generation information is generated based on a Sequence Authentication Code (SAC).

With regard to FIG. 5, an exemplary secure MU ranging measurement procedure 500 is described according to embodiments of the present invention, where the LTF sequence generation information is generated based on a Sequence Authentication Code (SAC). The Trigger Frame (TF)→Location Uplink Sounding indicates the SAC to use for the following NDP frame corresponding to the LTF generation information. After receiving the TF→Location Uplink Sounding, the ISTA uses the LTF generation information associated with the SAC. The SAC is also included in the IFTM for the first measurement instance and in the LMR for subsequent measurement instances. Because an attacker cannot know or predict the SAC, the attacker cannot trigger the measurement instance, for example, in a denial-of-service (DOS) attack. In addition, the SAC and its associated measurement results are carried in the LMR. If an invalid SAC is received by the ISTA, the ISTA may respond with a known LTF sequence or with any other LTF sequence and discards the current SAC and associated LTF sequence generation information. For these reasons, the size of the SAC should be sufficiently long to prevent simple guessing of the SAC.

Figure 6:
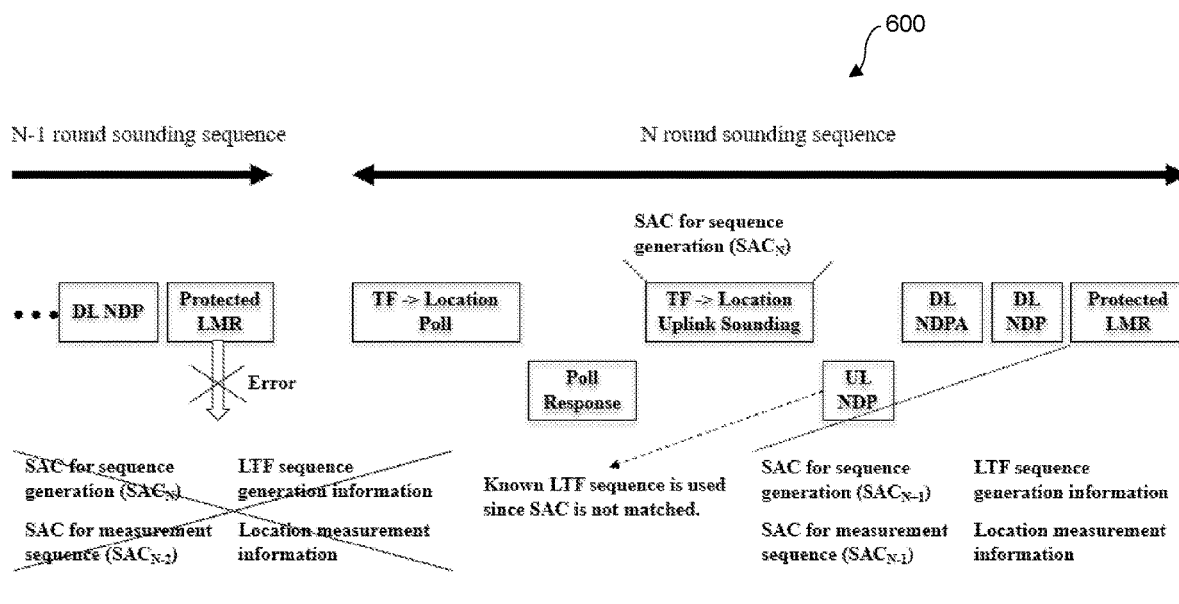
FIG. 6 depicts an exemplary secure MU ranging measurement procedure according to embodiments of the present invention, where the LMR requires a procedure for recovery the LMR in the case of reception failure.

With regard to FIG. 6, an exemplary secure MU ranging measurement procedure 600 is depicted according to embodiments of the present invention. The LMR is an Action No ACK frame and therefore requires a procedure for recovery the LMR in the case of reception failure. If the LMR was not correctly received, for the UL-NDP, the ISTA uses a known UL-NDP LTF sequence (not suitable for measurement). For the DL-NDP, the RSTA may use the secured DL-NDP LTF sequence (not suitable for measurement). If two sided LMR is used, the ISTA indicates that the measurements are invalidated. The RSTA sends a new protected LMR content (measurement results are lost only for immediate sounding sequence), and the ISTA may return to the channel and participate in a new sounding sequence at the next availability interval by responding to a future TF Location→Poll.

Exemplary NDP Sounding in Secure Ranging Measurement

For LTF Sequences of UL-NDP and D-NDP in a non-secure mode, LTF Sequences of UL-NDPs are fixed (e.g., common) and UL-NDPs are transmitted in MU format. For MU multiplexing, a P-matrix can be applied to UL-NDPs, where each STA uses the different P-matrix sequence for making an orthogonality. The LTF Sequence of the DL-NDP is not fixed, and the DL-NDP may be transmitted in SU format.

LTF Sequences of UL-NDP and DL-NDP in secure mode are dynamically determined and UL-NDPs are transmitted in MU format. For MU multiplexing, P-matrix can be applied to UL-NDPs. Each STA uses the different P-matrix sequence for making an orthogonality.

LTF Sequences of DL-NDPs are dynamically determined and DL-NDPs are transmitted in MU format. For MU multiplexing, P-matrix can be applied to DL-NDPs. For each DL-NDP, AP uses the different P-matrix sequence for making an orthogonality. When DL-NDP is transmitted in MU format, the number of the STSs that can be multiplexed in a single DL-NDP is limited. Therefore, in a staged mode, an additional DL-NDPA and DL-NDP transmission sequence may be necessary.

In a secure mode, MU Ranging Measurement may follows multiple DL-NDPA and DL-NDP transmission sequence after UL sounding. The UL-NDP and DL-NDP frames are transmitted in MU format from/to each STA. Initially, an STA and an AP negotiate the LTF Sequences Generation Keys for UL-NDP and DL-NDP during the ranging connection setup. For example:

LTF Sequences Set generated by Key A: LTFA+1, LTFA+2, LTFA+3, . . . , LTFA+N

LTF Sequences Set generated by Key B: LTFB+1, LTFB+2, LTFB+3, . . . , LTFB+N

LTF Sequences Set generated by Key C: LTFC+1, LTFC+2, LTFC+3, . . . , LTFC+N

LTF Sequences Set generated by Key D: LTFD+1, LTFD+2, LTFD+3, . . . , LTFD+N

If the STA and the AP choose the LTF Sequences Generation Key B and Key C for the UL-NDP and DL-NDP, then:

One sequence from {LTFB+1, LTFB+2, LTFB+3, . . . , LTFB+N} is used as the LTF Sequence of UL NDP One sequence from {LTFC+1, LTFC+2, LTFC+3, . . . , LTFC+N} is used as the LTF Sequence of DL NDP Moreover, in a secure ranging mode, each ranging measurements may use different LTF Sequences for UL-NDP and DL-NDP frames. For example, in a first ranging measurement, an STA and an AP use $LTF_{B+1}$ and $LTF_{C+1}$ as the LTF Sequences of the UL-NDP and DL-NDP respectively. In a second ranging measurement, the STA and AP should use $LTF_{B+3}$ and $LTF_{C+4}$ as the LTF Sequences of UL-NDP and DL-NDP, respectively. For this reason, in addition to a negotiation of the LTF Sequences Generation Keys for UL-NDP and DL-NDP, temporal keys used in each ranging measurement phase should be provided in advance of the LTF transmission of the NDPs.

To deliver temporal keys, a SIG field of the UL-NDP and DL-NDP frames indicate the temporal key for identifying the LTF Sequence in the UL-NDP and DL-NDP respectively. Alternatively, a User Info field in the trigger frame indicates the temporal keys identifying for the LTF Sequence in UL-NDP and STA Info field in NDPA indicates the temporal keys for identifying the LTF Sequences in the DL-NDP. In this case, the LTF Sequence of UL-NDP is determined by the UL-NDP Temporal Key value obtained from the User Info field of the Trigger frame and the LTF Sequences Generation Key value of UL-NDP negotiated by the STA and the AP. The LTF Sequence of DL-NDP is determined by the DL-NDP Temporal Key value obtained from the STA Info field of the NDPA and the LTF Sequences Generation Key value of DL-NDP negotiated by a STA and an AP.

Secure LTF Measurement Exchange Protocol for HEz Mode

Figure 7:
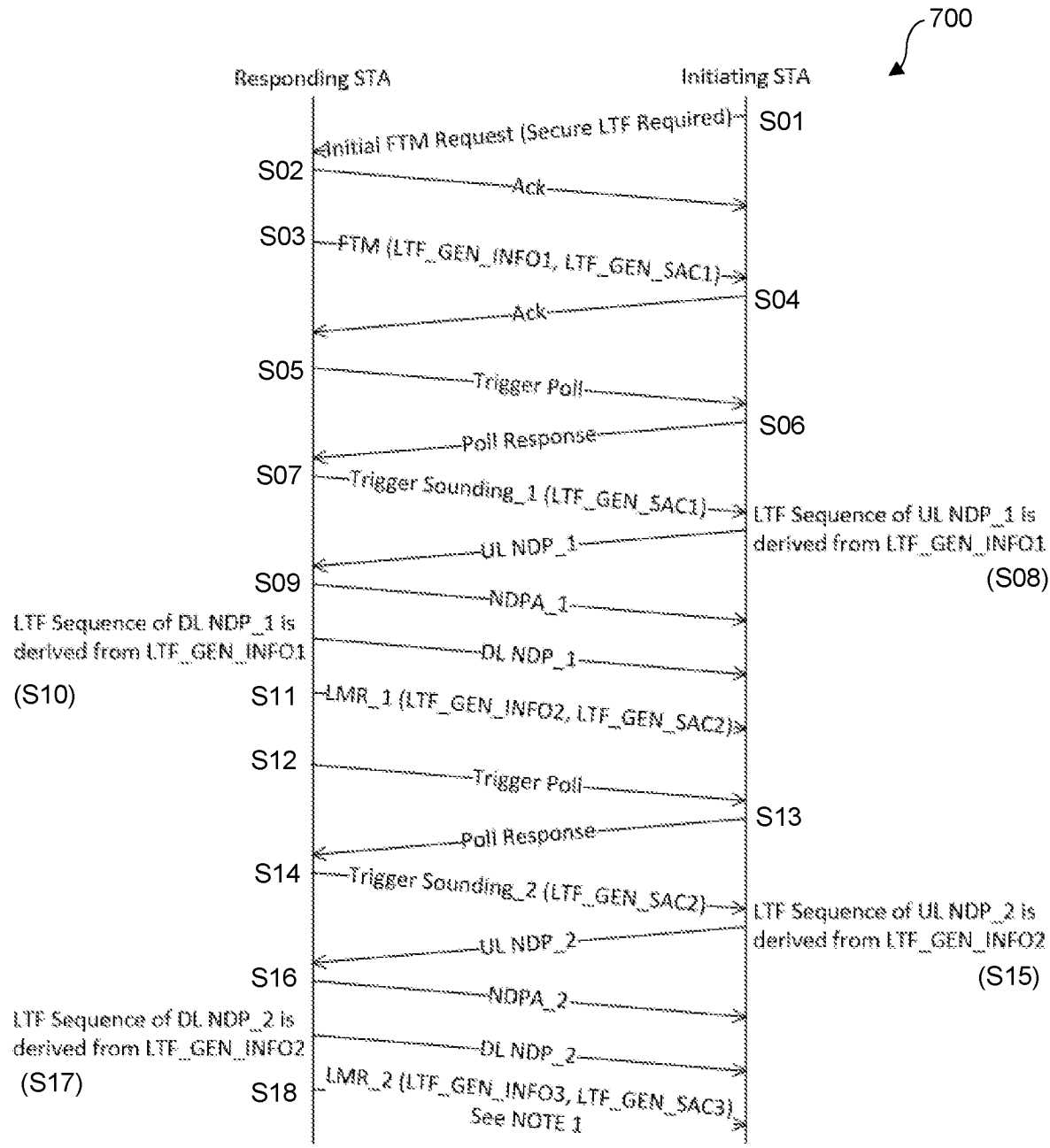
FIG. 7 is a transmit and receive diagram depicting an exemplary secure measurement exchange in HEz mode according to embodiments of the present invention.

FIG. 7 is a transmit and receive diagram depicting an exemplary secure measurement exchange 700 in HEz mode according to embodiments of the present invention.

At step S01, an initial FTM request is sent from an ISTA to an RSTA. Responsive to the initial FTM request, the RSTA issues an acknowledgement (ACK) frame back to the ISTA at step S02. At step S03, an FTM frame including LFT sequence generation information and a LTF generation SAC is sent from the RSTA to the ISTA. At step S04, the ISTA sends and ACK frame acknowledging the FTM frame. At step S05, the ISTA issues a trigger poll, and the RSTA responds to the trigger poll by issuing a poll response at step S06.

At step S07, the RSTA sends a location variant HEz Uplink Sounding Trigger frame where the LTF Generation SAC subfield in the Trigger Dependent User Info field in the Location variant HEz Uplink Sounding Trigger frame is set to the same value as in the LTF Generation SAC field in the Secure LTF Parameters field in the most recently transmitted an initial Fine Timing Measurement frame or a Location Measurement Report frame, except when a current LTF Generation SAC and its associated LTF Sequence Generation Information stored as the RSTA have been discarded. In that case, an RSTA that sends a Location variant HEz Uplink Sounding Trigger frame shall set the LTF Generation SAC subfield in the Trigger Dependent User Info field in the Location variant HEz Uplink Sounding Trigger frame to a pre-determined value to indicate that a new LTF Sequence Generation information is needed.

At step S08, the ISTA sends UL-NPD frame including an LTF sequence derived from LTF generation information associated with the LTF Generation SAC obtained in the received Location variant HEz Uplink Sounding Trigger frame. If the RSTA successfully receives an UL NPD a SIFS after the Location variant HEz Uplink Sounding Trigger frame, the RSTA shall respond with a NDP Announcement frame (S09) followed after a SIFS by a DL-NDP frame (S10), and a Location Measurement Report frame (S11), where the Location Measurement Report frame shall contain a Secure LTF Parameters field with a new LTF Generation SAC and a new LTF Sequence Generation Information associated with the LTF Generation SAC. Otherwise, the RSTA shall follow EDCA backoff procedures as the frame exchange is not successful, and it shall discard a current LTF Generation SAC and its associated LTF Sequence Generation Information stored at the RSTA. The LTF sequence of the DL NDP may be derived from the LTF generation information associated with the LTF Generation SAC in the transmitted Location variant HEz Uplink Sounding Trigger frame. Steps S04-S11 may be repeated a number of times to perform multiple ranging measurement exchanges using LTF sequences derived from prior received LMR frames. For example, steps S12-S18 repeat steps S04-S11 using an LTF sequence derived from the LTF Generation SAC and its associated LTF Sequence Generation Information contained in the LMR frame transmitted in step S11.

According to some embodiments, the RSTA determines the LTF sequence of the UL NDP and the LTF sequence of the DL NDP with the LTF Sequence Generation Information in the Secure LTF Parameters field in the most recently transmitted an initial Fine Timing Measurement frame or a Location Measurement Report frame that is associated with the LTF Generation SAC subfield in the Trigger Dependent User Info field in the transmitted Location variant HEz Uplink Sounding Trigger frame, except when the LTF Generation SAC subfield in the Trigger Dependent User Info field in the transmitted Location variant HEz Uplink Sounding Trigger frame is equal to the pre-determined value to indicate that a new LTF Sequence Generation information is needed. In that case, the LTF sequence of the UL-NDP and the LTF sequence of the DL-NDP are determined to the pre-determined sequence.

Figure 8:
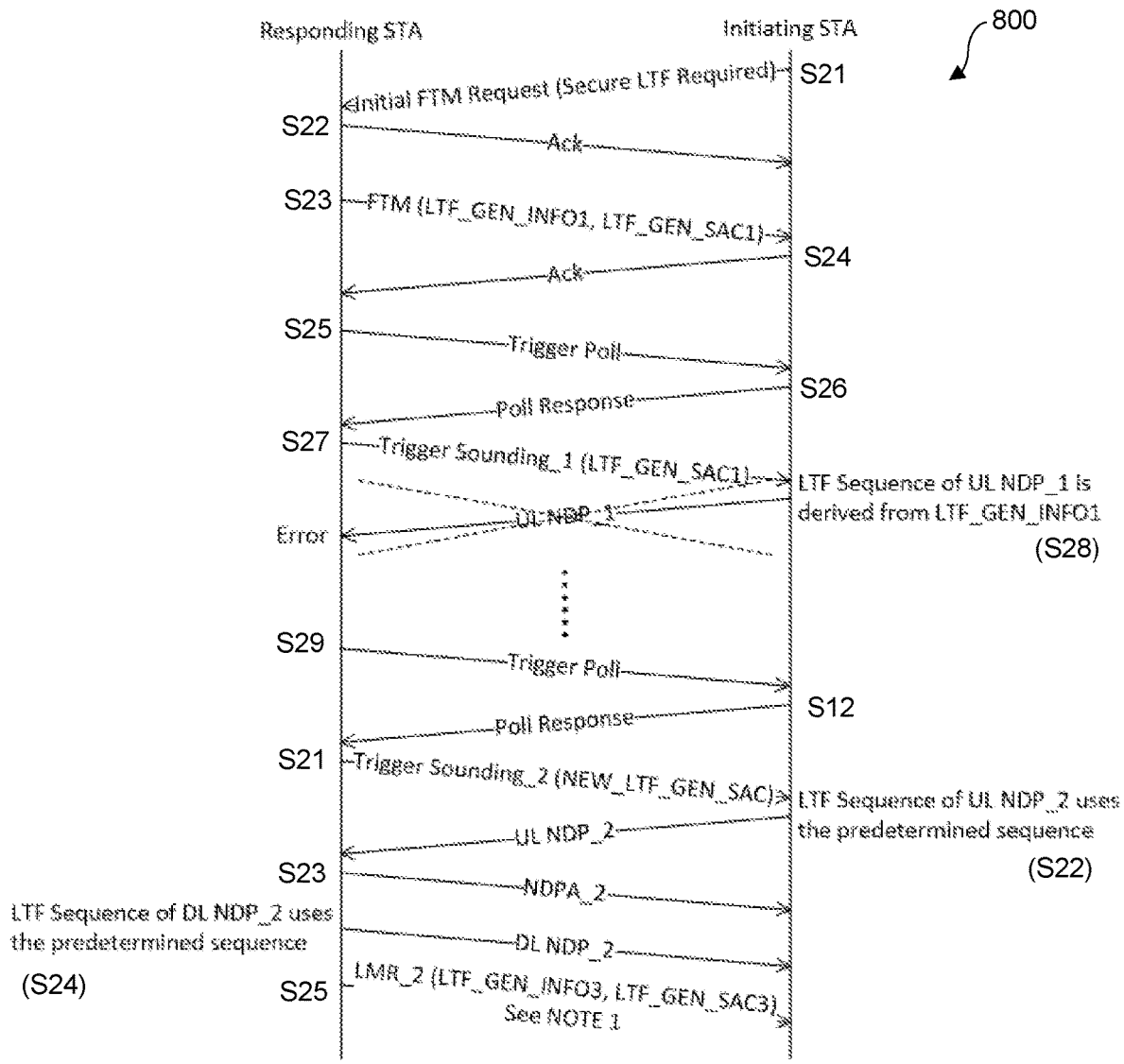
FIG. 8 illustrates a secure measurement exchange of an exemplary recovery procedure of an LTF Generation SAC and its associated LTF Sequence Generation Information parameters according to embodiments of the present invention.

With regard to FIG. 8, an exemplary recovery procedure of the LTF Generation SAC and its associated LTF Sequence Generation Information parameters are depicted in secure measurement exchange 800 according to embodiments of the present invention. At step S21, an initial FTM request is sent from an ISTA to an RSTA. At step S22, an ACK frame is sent to the ISTA responsive to the initial FTM request. At step S23, an FTM frame including LTF sequence generation information and an LTF SAC is sent to the ISTA. At S23, an ACK frame is sent in reply to the FTM frame, and a trigger poll is issued at step S25. At step S26, the ISTA issues a poll response.

At step S27, an Uplink Sounding Trigger frame is sent by the RSTA and includes the LTF generation SAC provided in the FTM frame. An LTF sequence of an UL-NDP frame is generated according to the LTF sequence generation information associated with the LTF generation SAC at step S28, but a transmission error prevents the RSTA from receiving the UL-NDP frame sent by the ISTA. For secure HEz ranging measurement using a channel access error recovery operation, if an RSTA failed to receive an UL-NDP from an ISTA, the RSTA discards the current SAC and associated LTF sequence generation information. In a new sounding sequence, at S29, an RSTA that does not have current SAC and associated LTF sequence generation information sets the SAC in the Trigger Frame (TF)→Location Uplink Sounding to the pre-determined value to indicate that a new LTF Sequence Generation information is needed. A poll response is provided by the ISTA at step S20.

At step S21, an ISTA that received the Trigger Frame (TF)→Location Uplink Sounding where the SAC is set to the pre-determined value determines the LTF sequences of the UL-NDP and DL-NDP to the pre-determined sequence. The new trigger sounding frame is provided to the ISTA including a new LTF generation SAC. At step S22, the LTF sequence of the new UL-NDP frame uses a predetermined sequence. The RSTA responds to the new UL-NDP by transmitting an NDP announcement frame at step S23, and the LTF sequence for the subsequent DL-NDP frame is determined based on the predetermined sequence at step S24. At step S25, a LMR frame is generated based on the predetermined LTF sequence and includes additional LTF Sequence Generation information and the associated SAC.

According to some embodiments, when an ISTA receives a Location variant HEz Uplink Sounding Trigger frame and a value of the LTF Generation SAC subfield in the Trigger Dependent User Info field in the Location variant HEz Uplink Sounding Trigger frame is equal to a value of the LTF Generation SAC subfield in the Secure LTF Parameters field stored at the ISTA, the ISTA determines the LTF sequence of an UL-NDP transmitted a SIFS after the Location variant HEz Uplink Sounding Trigger frame and LTF sequence of a DL-NDP received a SIFS after a NDP Announcement frame with the LTF Sequence Generation Information associated with the value of the LTF Generation SAC subfield in the Trigger Dependent User Info field in the Location variant HEz Uplink Sounding Trigger frame. The ISTA discards a current LTF Generation SAC and its associated LTF Sequence Generation Information stored at the ISTA.

According to some embodiments, when an ISTA receives a Location variant HEz Uplink Sounding Trigger frame and a value of the LTF Generation SAC subfield in the Trigger Dependent User Info field in the Location variant HEz Uplink Sounding Trigger frame is not equal to a value of the LTF Generation SAC subfield in the Secure LTF Parameters field stored at the ISTA, the ISTA determines the LTF sequence of an UL-NDP transmitted a SIFS after the Location variant HEz Uplink Sounding Trigger frame and LTF sequence of a DL-NDP received a SIFS after a NDP Announcement frame to TBD (pre-determined) sequence or any other LTF sequence and discards a current LTF Generation SAC and its associated LTF Sequence Generation Information stored at the ISTA.

According to some embodiments, when a Location Measurement Report frame contains range measurement results calculated from an UL-NDP and a DL-NDP that have a secure LTF sequence suitable for a range measurement, a STA that transmits the Location Measurement Report frame shall include the Secure LTF Parameters field in the Location Measurement Report frame and set a value of the Range Measurement SAC subfield in the Secure LTF Parameters field in the Location Measurement Report frame to the same value as in the LTF Generation SAC field in the Trigger Dependent User Info field in the Location variant HEz Uplink Sounding Trigger frame that solicited the UL-NDP and the DL-NDP. For example, when LMR_2 is a delayed feedback type, Range Measurement SAC carried in LMR_2 is set to LTF_GEN_SAC1, and when LMR_2 is an immediate feedback type, Range Measurement SAC carried in LMR_2 is set to LTF_GEN_SAC2.

According to some embodiments, the ISTA determines the LTF sequence of the UL NDP and the LTF sequence of the DL NDP with the LTF Sequence Generation Information in the Secure LTF Parameters field in the most recently received an initial Fine Timing Measurement frame or a Location Measurement Report frame that is associated with the LTF Generation SAC subfield in the Trigger Dependent User Info field in the received Location variant HEz Uplink Sounding Trigger frame.

Exemplary Computer System

Embodiments of the present invention are drawn to electronic systems for providing securing ranging measurements for wireless devices. The following discussion describes one such exemplary electronic system or computer system can be used as a platform for implementing embodiments of the present invention.

Figure 9:
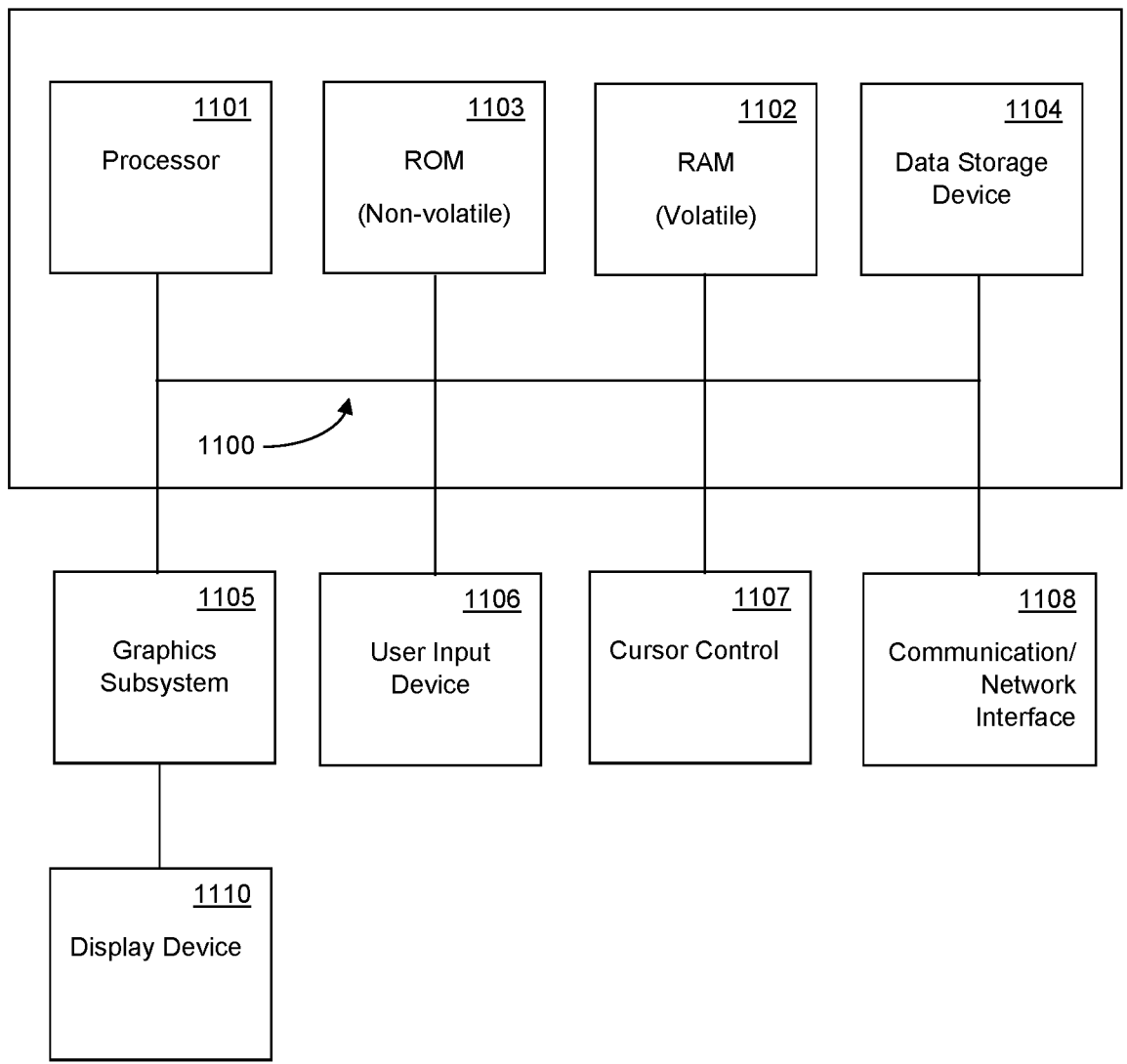
FIG. 9 depicts an exemplary computer system (e.g., a wireless STA) upon which embodiments of the present invention may be implemented.

In the example of FIG. 9, the exemplary computer system 1112 (e.g., a wireless access point or wireless station) includes a central processing unit (CPU) 1101 for running software applications and optionally an operating system. Random access memory 1102 and read-only memory 1103 store applications and data for use by the CPU 1101. Data storage device 1104 provides non-volatile storage for applications and data and may include fixed disk drives, removable disk drives, flash memory devices, and CD-ROM, DVD-ROM or other optical storage devices. The optional user inputs 1106 and 1107 comprise devices that communicate inputs from one or more users to the computer system 1112 (e.g., mice, joysticks, cameras, touch screens, and/or microphones).

A communication or network interface 1108 allows the computer system 1112 to communicate with other computer systems, networks, or devices via an electronic communications network, including wired and/or wireless communication and including an Intranet or the Internet. The optional display device 1110 may be any device capable of displaying visual information in response to a signal from the computer system 1112 and may include a flat panel touch sensitive display, for example. The components of the computer system 1112, including the CPU 1101, memory 1102/1103, data storage 1104, user input devices 1106, and graphics subsystem 1105 may be coupled via one or more data buses 1100.

In the embodiment of FIG. 9, an optional graphics subsystem 1105 may be coupled with the data bus and the components of the computer system 1112. The graphics system may comprise a physical graphics processing unit (GPU) 1105 and graphics/video memory. GPU 1105 may include one or more rasterizers, transformation engines, and geometry engines, and generates pixel data from rendering commands to create output images. The physical GPU 1105 can be configured as multiple virtual GPUs that may be used in parallel (e.g., concurrently) by a number of applications or processes executing in parallel, or multiple physical GPUs may be used simultaneously. Graphics sub-system 1105 outputs display data to optional display device 1110.

The display device 1110 may be communicatively coupled to the graphics subsystem 1105 using HDMI, DVI, DisplayPort, VGA, etc.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Embodiments of the present invention are thus described. While the present invention has been described in particular embodiments, it should be appreciated that the present invention should not be construed as limited by such embodiments, but rather construed according to the following claims.

What is claimed is:

1. A method of secure measurement exchange between wireless devices, said method comprising:
    receiving an initial FTM request from an initiating STA;
    transmitting an FTM frame comprising Long Training Field (LTF) generation information and an associated LTF generation sequence authentication code to the initiating STA;
    transmitting an uplink sounding trigger frame comprising LTF generation information and an LTF generation sequence authentication code from a responding STA to the initiating STA;
    receiving a UL-NDP frame from the initiating STA, wherein the UL-NDP frame comprises a first LTF sequence derived from the LTF generation information associated with the LTF generation sequence authentication code;
    transmitting an NDP announcement frame and a DL-NDP frame from the responding STA, wherein the DL-NDP frame comprises a second LTF sequence derived from the LTF generation information associated with the LTF generation sequence authentication code; and
    transmitting an LMR frame generated according to the first and second LTF sequences.

2. A method as described in claim 1, wherein said LMR frame comprises second LTF generation information and a second LTF generation sequence authentication code.

3. A method as described in claim 2, further comprising deriving additional LTF sequences used in subsequent UL-NDP and DL-NDP frames using said second LTF generation information and said second LTF generation sequence authentication code.

4. A method as described in claim 1, wherein said LTF sequence comprises a randomized LTF sequence.

5. A method as described in claim 1, wherein the sequence authentication code is included in the FTM for a first measurement instance and included in a subsequent LMR frame for a subsequent measurement instance.

6. A method as described in claim 1, further comprising determining that an incorrect sequence authentication code is received by the initiating STA.

7. A method as described in claim 6, further comprising transmitting a pre-determined LTF sequence and discarding the incorrect SAC and any associated LTF sequence generation information.

8. A device for performing secure measurement exchange between wireless devices, said device comprising:
    a memory for storing data; and
    a processor communicatively coupled to said memory and configured to execute instructions for performing a method of secure measurement exchange, said method comprising:
    receiving an initial FTM request from an initiating STA;
    transmitting a FTM frame comprising Long Training Field (LTF) generation information and an associated LTF generation sequence authentication code to the initiating STA;
    transmitting an uplink sounding trigger frame comprising the LTF generation sequence authentication code to the initiating STA;
    receiving a UL-NDP frame from the initiating STA, wherein the UL-NDP frame comprises a first LTF sequence derived from the LTF generation information associated with the LTF generation sequence authentication code;
    transmitting an NDP announcement frame and a DL-NDP frame to the initiating STA, wherein the DL-NDP frame comprises a second LTF sequence derived from the LTF generation information associated with the LTF generation sequence authentication code; and
    transmitting an LMR frame generated according to the first and second LTF sequences.

9. A device as described in claim 8, wherein said LMR frame comprises second LTF generation information and a second LTF generation sequence authentication code.

10. A device as described in claim 9, wherein the method further comprises deriving additional LTF sequences used in subsequent UL-NDP and DL-NDP frames using said second LTF generation information and said second LTF generation sequence authentication code.

11. A device as described in claim 8, wherein said LTF sequence comprises a randomized LTF sequence.

12. A device as described in claim 8, wherein the sequence authentication code is included in the FTM for a first measurement instance and included in a subsequent LMR frame for a subsequent measurement instance.

13. A device as described in claim 8, wherein said method further comprises:
    determining that an incorrect LTF generation sequence authentication code is received by the initiating STA; and
    transmitting a pre-determined LTF sequence, wherein the incorrect LTF generation sequence authentication code and any associated LTF sequence generation information are discarded.

14. A device for performing secure measurement exchange between wireless devices, said device comprising:
    a memory for storing data; and
    a processor communicatively coupled to the memory and configured to execute instructions for performing a method of secure measurement exchange, said method comprising:
    transmitting an initial FTM request to a responding STA;
    receiving an FTM frame comprising Long Training Field (LTF) generation information and an LTF generation sequence authentication code from the responding STA;
    receiving an uplink sounding trigger frame comprising the LTF generation sequence authentication code from the responding STA;
    transmitting a UL-NDP frame to the responding STA, wherein the UL-NDP frame comprises a first LTF sequence derived from the LTF generation information associated with the LTF generation sequence authentication code;

receiving an NDP announcement frame and a DL-NDP frame, wherein the DL-NDP frame comprises a second LTF sequence derived from the LTF generation information associated with the LTF generation sequence authentication code; and receiving an LMR frame generated according to the first and second LTF sequences.

15. A device as described in claim 14, wherein said LMR frame comprises second LTF generation information and a second LTF generation sequence authentication code.

16. A device as described in claim 15, wherein said method further comprises deriving additional LTF sequences used in subsequent UL-NDP and DL-NDP frames using said second LTF generation information and said second LTF generation sequence authentication code.

17. A device as described in claim 14, wherein said LTF sequence comprises a randomized LTF sequence.

18. A device as described in claim 14, wherein the sequence authentication code is included in the FTM for a first measurement instance and included in a subsequent LMR frame for a subsequent measurement instance.

19. A device as described in claim 14, wherein said method further comprises:
   identifying an incorrect LTF generation sequence authentication code;
   receiving a pre-determined LTF sequence; and
   discarding the incorrect LTF generation sequence authentication code and any associated LTF sequence generation information.

20. A device as described in claim 14, wherein the responding STA operates in a High Efficiency (HEz) mode.

* * * * *